United States Patent [19]

Semiatin et al.

[11] Patent Number: 5,447,580
[45] Date of Patent: Sep. 5, 1995

[54] RAPID HEAT TREATMENT OF NONFERROUS METALS AND ALLOYS TO OBTAIN GRADED MICROSTRUCTURES

[75] Inventors: Sheldon L. Semiatin, Dayton; Douglas R. Barker, Centerville, both of Ohio

[73] Assignee: The United States of America as represented by the Secretary of the Air Force, Washington, D.C.

[21] Appl. No.: 200,600

[22] Filed: Feb. 23, 1994

[51] Int. Cl.[6] .............................................. B23K 9/00
[52] U.S. Cl. ................................. 148/565; 148/421; 148/670; 420/902
[58] Field of Search ..................... 148/565, 670, 421; 420/902

[56] References Cited

U.S. PATENT DOCUMENTS

| | | | |
|---|---|---|---|
| 4,151,014 | 4/1979 | Charschan et al. | 148/565 |
| 4,279,667 | 7/1981 | Anthony et al. | 148/565 |
| 4,401,477 | 8/1983 | Clauer et al. | 148/565 |
| 4,648,912 | 3/1987 | Sabol et al. | 148/565 |
| 4,872,926 | 10/1989 | Giacobe | 148/565 |
| 4,909,859 | 3/1990 | Nazmy et al. | 148/565 |
| 5,354,963 | 10/1994 | Mueller et al. | 148/565 |

*Primary Examiner*—Upendra Roy
*Attorney, Agent, or Firm*—Bobby D. Scearce; Thomas L. Kundert

[57] ABSTRACT

A method for heat treatment of nonferrous metals and alloys is described which comprises the steps of providing a billet of material comprising nonferrous metal or alloy; rapidly heating the billet to a temperature higher than the transus or solvus temperature of the material whereby a microstructure of uniform single phase grains is formed in a surface layer of preselected depth or other selected region in the billet with the starting microstructure of the material central of the billet; and cooling the billet to room temperature to preserve in the billet surface the high temperature single phase microstructure or a transformation product thereof.

5 Claims, 1 Drawing Sheet

RAPID HEAT TREATMENT OF NONFERROUS METALS AND ALLOYS TO OBTAIN GRADED MICROSTRUCTURES

RIGHTS OF THE GOVERNMENT

The invention described herein may be manufactured and used by or for the Government of the United States for all governmental purposes without the payment of any royalty.

BACKGROUND OF THE INVENTION

The present invention relates generally to methods for heat treating metals and alloys, and more particularly to a heat treating method for producing preselected graded microstructures in nonferrous metals and alloys.

In conventional surface and selective heat treatment methods for ferrous materials, surface layers or other selected regions are typically rapidly heated to the single-phase austenite phase and then rapidly cooled. Temperatures somewhat higher than those typically used for furnace based processes are used to minimize the time required for solutioning the ferrite and carbide phases. Because of the rapid increase in solutioning kinetics with temperature, short austenizing times (seconds) can be used. The treated material has a hardened surface layer with good strength and abrasion resistance and a tough, unhardened ductile core.

Titanium and nickel-base alloys are usually heated in large vacuum, atmosphere or air furnaces, at heat times typically of the order of hours, the final microstructure being uniform throughout the alloy. Graded microstructures in nonferrous materials have heretofore been produced only using a large number of expensive steps including preform design and forging, intermediate furnace heat treatment (beta annealing), finish forging and final (subtransus) furnace heat treatment.

The invention solves or substantially reduces in critical importance problems with prior art processes as just suggested by providing a method for the rapid and controlled surface heating of nonferrous metals and alloys, particularly titanium and nickel base alloys with suitable (usually fine, equiaxed, two-phase) starting microstructures, to produce graded microstructure and corresponding graded properties in semifinished or finished parts with substantially no distortion. The method is based on rapid heating of surface or selective regions of the nonferrous part to temperatures sufficiently high to bring about a phase transformation, such as solution of a second phase, followed by cooling at an appropriate rate to retain the high temperature phase so produced or to transform the selectively heated region to a microstructure substantially different from that of the starting material. By this means, regions containing essentially the starting microstructure, a different heat treated microstructure, and a transition zone may be produced. The invention allows achievement of desired combinations of creep and fatigue resistance, toughness, strength and other properties.

It is therefore a principle object of the invention to provide a heat treatment method for producing graded microstructure in nonferrous metals and alloys.

It is another object of the invention to provide a heat treatment method for titanium and nickel based alloys.

It is yet another object of the invention to provide a heat treatment method for producing graded microstructures in titanium and nickel based alloys for aerospace applications.

These and other objects of the invention will become apparent as a detailed description of representative embodiments proceeds.

SUMMARY OF THE INVENTION

In accordance with the foregoing principles and objects of the invention, a method for heat treatment of nonferrous metals and alloys is described which comprises the steps of providing a billet of material comprising nonferrous metal or alloy; rapidly heating the billet to a temperature higher than the transus or solvus temperature of the material whereby a microstructure of uniform single phase grains is formed in a surface layer of preselected depth or other selected region in the billet with the starting microstructure of the material central of the billet; and cooling the billet to room temperature to preserve in the billet surface the high temperature single phase microstructure or a transformation product thereof.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
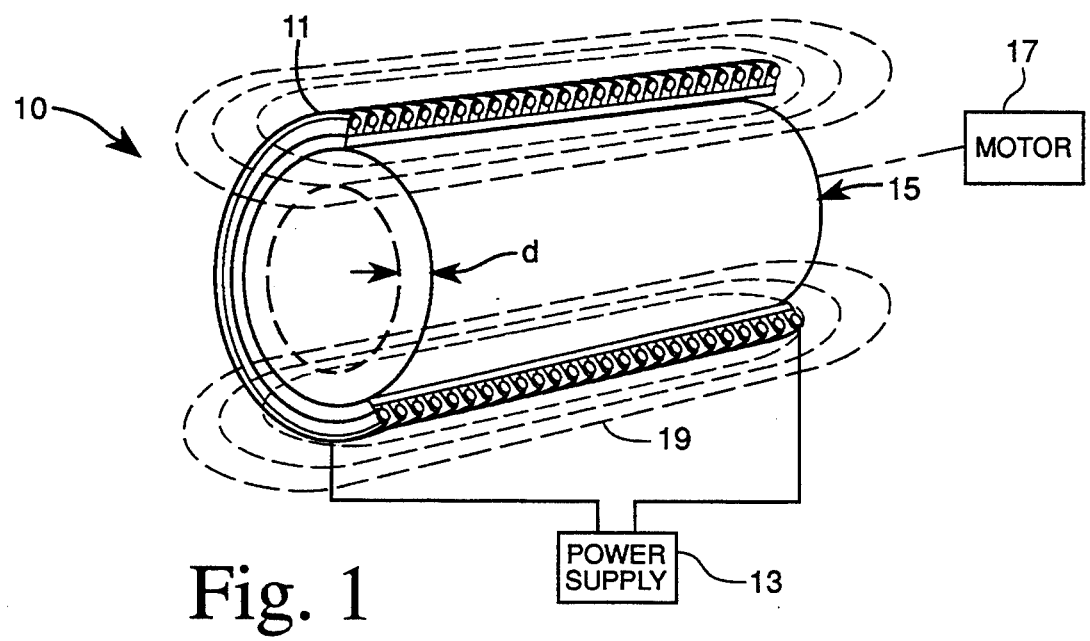
FIG. 1 illustrates a representative system for rapid heat treating of an alloy to produce a graded microstructure in the alloy according to the invention.

Referring now to the drawings, FIG. 1 shows representative system 10 for rapid heat treatment of an alloy in accordance with the teachings of the invention to produce a graded microstructure in the alloy. In system 10, helical water-cooled induction heating coil 11 powered by variable frequency power supply 13 is used to rapidly heat round billet 15 of a typical alpha-beta titanium alloy, Ti—6Al—4V. It is noted at the outset that, though induction heating was selected for demonstration of the invention, other heating means may be used as would occur to the skilled artisan, including infrared, high intensity (tungsten filament) infrared, direct electric resistance, flame, white light source, laser, and electron beam. Indirect electric resistance and gas fired furnaces may also be used if the area to be selectively treated is small in cross section (and may be rapidly heated) compared to the bulk of the alloy, and a heat sink or chill block is used to minimize the effects of heat conduction.

Heat treatment results may be optimized by rotating billet 15 about its axis using suitable means such as motor 17 operatively attached to billet 15. According to a governing principle of the invention, surface layers of billet 15 in which an alternate or graded microstructure is desired are rapidly heated (in regions of magnetic field lines 19) to minimize heat conduction further inward, and billet 15 is cooled at a suitable rate depending on the preselected graded microstructure to be attained.

In using induction heating to effect desired microstructural changes in billet 15, heating parameters (frequency, power, heating time) are selected according to surface thickness d to be affected and the metallurgy of the alloy comprising billet 15. To a good approximation, the depth d affected by induction heating of nonmagnetic round bars is equal to $3160(p/f)^{\frac{1}{2}}$, where p is the resistivity (ohm-in) of the billet alloy material and f is the power supply frequency (Hz). Because resistivity of most materials increases with temperature, a value of p at a desired peak heating temperature is usually chosen. In general, for typical power densities (1-20 kW/in$^2$), the transformed layer depth will be slightly larger than that given by the approximation for d because of heat conduction effects, by an incremental amount of approximately $(at)^{\frac{1}{2}}$, where t is heating time (seconds) and a is a constant ($\leqq 0.01$), which makes the increment usually much smaller than d. Heating time t is determined to first order by the power level P during induction heating, heat content c of the alloy at the desired peak temperature, mass m of the affected depth of the billet, and coupling efficiency n ($<1$) between the billet and induction coil, $t=mc/Pn$. Power is not a totally independent parameter because power densities (power per unit surface area of the heated part) must be held at relatively high levels to minimize t and heat conduction effects.

Analyses similar to the foregoing may be made by one skilled in the applicable art with respect to induction heating as well as heating means other than induction and with respect to billet configurations of substantially any shape, all within the scope of these teachings and of the appended claims.

Figure 2:
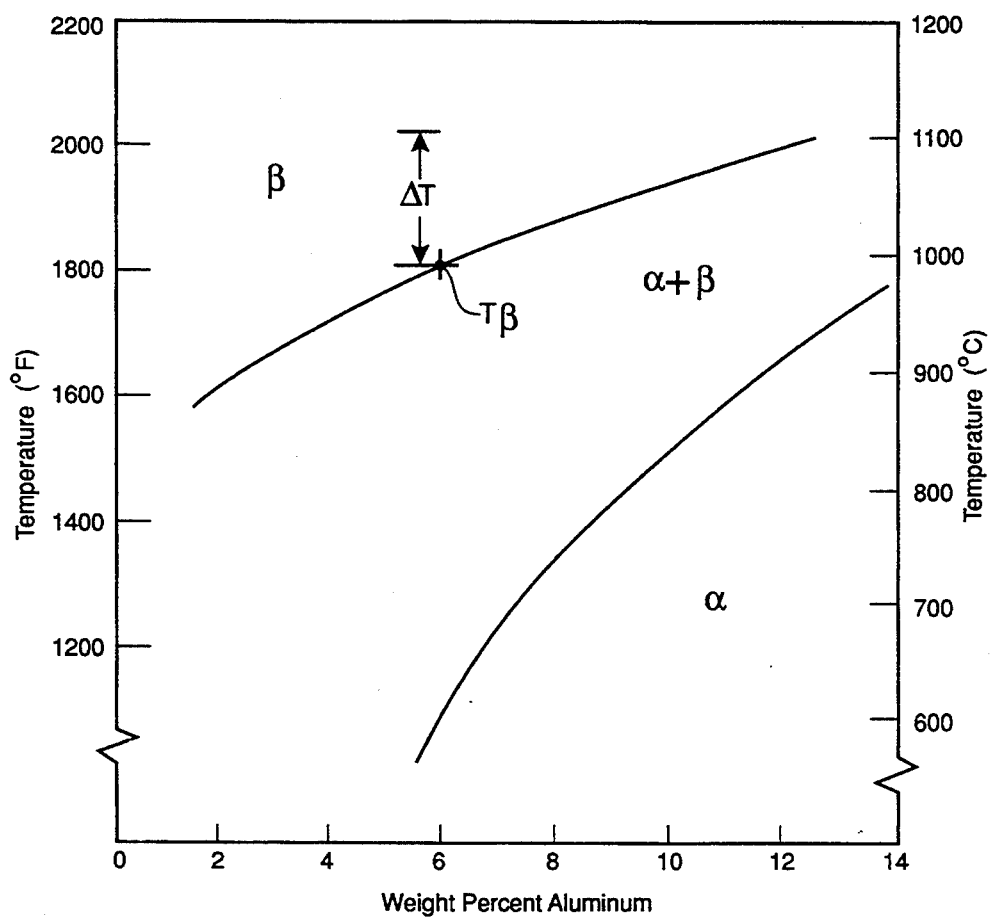
FIG. 2 is a pseudobinary phase diagram for Ti—Al (4% V).

The dependence of microstructure on temperature is represented by equilibrium phase diagrams for the alloys of interest. For example, FIG. 2 is a simplified phase diagram for titanium alloys containing 4 wt % vanadium and various weight percents aluminum, indicating various phase fields and the temperature above which the material becomes single phase beta (beta transus $T_\beta$). At temperatures below $T_\beta$ (1820° F.), the microstructure of fully recrystallized alpha-beta worked Ti—6Al—4V alloy consists of fine (about 10 microns) equiaxed grains of hexagonal close packed alpha phase surrounded by partially stabilized regions of the high temperature beta phase, usually referred to as transformed beta. By raising the temperature of Ti—6Al—4V (or similar) alloy above $T_\beta$, the alloy will form a uniform single phase body-centered cubic structure of beta grains. The rate at which this occurs during nonequilibrium rapid heating will be largely dependent on the magnitude of $\Delta T$ (FIG. 2); time required for solutioning the alpha phase decreases with $\Delta T$. For sufficiently large $\Delta T$ (200°-300° F.) the solutioning process time may be of the order of seconds. Short times above $T_\beta$ tend to minimize growth of the beta grain size. After the beta phase is formed, the alloy is cooled to room temperature to effect final transformation of the high temperature phase. For a round Ti—6Al—4V bar surface heated by induction to a temperature in the beta phase field, a final microstructure comprising a central core (subjected to relatively low temperature) of essentially the starting microstructure, a surface layer of transformed beta microstructure (specific morphology depends on the cooling rate immediately after induction heating), and a transition zone between the two regions obtains.

Heat treatments in demonstration of the invention were performed on 3-inch diameter by 3-inch long billets of Ti—6Al—4V alloy having starting microstructure consisting of 10 micron equiaxed alpha grains surrounded by a small amount of transformed beta. The billets were heated within induction coil 11 (FIG. 1) with power supply 13 operating at 4 kHz and 25 kW. Depth d for Ti—6Al—4V (using $p=75\times 10^{-6}$ ohm-in, corresponding to peak temperature of about 2100° F.) is about 0.43 inch and contains 1.67 lb of billet material. Using a heat capacity of 0.10 kWh/lb at 2100° F. and coupling efficiency of 0.4, the required heating time to reach 2100° F. ($T_\beta+280$° F.) is about 0.0167 hours (60 sec).

In demonstration heat treatments of 55 to 65 second duration, temperature sensitive crayon markings on the billet surfaces indicated that the peak surface temperature was 2050° to 2150° F. After the samples cooled, metallographic evaluation showed a surface layer about 0.50 inch containing a fully lamellar transformed structure of prior beta grain size equal to 100 microns, a central core of essentially the starting microstructure of 10 micron equiaxed alpha and a thin transition zone about 0.1 inch between the two regions.

Although Ti—6Al—4V was used as a demonstration material, the method of the invention can apply to a wide range of two-phase (or multi-phase) alloys in which microstructure development can be manipulated through short time, high temperature excursions into a single phase (or multi-phase) field, such as, (1) near alpha, alpha-beta, near-beta, beta, and alpha-alpha-two titanium alloys, such as Ti—8Al—1Mo—1V, Ti—5Al—2.5Sn, Ti—6Al—4V, Ti—6Al—2Sn—4Zr—2Mo, Ti—6Al—2Sn—4Zr—6Mo, Ti—6Al—6V—2Sn, Ti—10V—2Fe—3Al, Ti—15V—3Cr—2Sn—3Al, and Timetal 21S, which alloys may be rapidly selectively beta annealed to produce a region of transformed lamellar structure; (2) alpha-two titanium aluminides, such as Ti—24Al—11Nb, Ti—25Al—10Nb—3V—1Mo, and Ti—25Al—17Nb (atomic percent), which may have fine, equiaxed starting microstructures and which can also be rapidly beta annealed to produce graded microstructures containing transformed beta lamellar regions; (3) near gamma and gamma titanium aluminides, such as Ti—(45-48)Al—2Cr—2Nb, Ti—4-6Al—5Nb—1W (atomic percent), in which a short time excursion into either single phase alpha or single phase beta fields can be used to produce a graded structure of lamellar, transformed alpha or lamellar transformed beta in an alloy with a starting structure which is fine equiaxed gamma; and (4) iron, nickel and iron-nickel base superalloys (particularly powder metallurgy alloys), such as Waspaloy, Astroloy, Udimet 700, IN-100, Rene 95, R88DT, 718, 720, 901 and A-286, selectively heated above the solvus temperature into the single phase field (supersolvus heated) to produce a coarse grain, creep resistant microstructure. Rapid heating times for each alloy may be in the range of about 1 to 100 seconds.

Heating parameters/nay be selected by one skilled in the art guided by these teachings. For brittle materials which are sensitive to thermal stresses developed in the presence of temperature gradients, the pan may be preheated to slowly raise the temperature of the entire part sufficiently to minimize temperature gradients in the part during the subsequent rapid heating of the part to achieve a desired microstructure. Moreover, after treatment according to the invention, a part may be given subsequent heat treatment for microstructure stabilization, aging, etc.

The invention comprises a single operation which is amenable to automation and is quicker than conventional heat treatments for producing graded microstructures in nonferrous alloys. Because the process is a selective or surface heat treatment, that is, the bulk of the billet material is heated to relatively low temperatures during processing and limits the regions which are heated to high temperatures, part distortion is generally very low and final machining or straightening operations can often be avoided.

The graded microstructure may be tailored for a specific end use. For the Ti—6Al—4V alloy, the transformed beta surface layer provides a region of high toughness and creep resistance, and the inner core of free equiaxed alpha provides desirable strength and fatigue life properties in semifinished products or finished parts of substantially any geometry.

The invention therefore provides a heat treatment method for producing preselected graded microstructures in nonferrous metals and alloys. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A method for heat treatment of nonferrous metals and alloys, comprising the steps of:
    (a) providing a billet of material comprising nonferrous metal or alloy;
    (b) rapidly heating said billet to a temperature higher than the transus temperature of said material whereby a coarse grain microstructure of uniform single phase grains is formed in a surface layer of preselected depth in said billet and the starting microstructure of said material central of said billet; and
    (c) cooling said billet to room temperature.

2. The method of claim 1 whereby the heating step is performed using induction heating.

3. The method of claim 1 wherein said material is an alloy selected from the group consisting of near alpha, alpha-beta, near-beta, beta, and alpha-alpha-two titanium alloys; alpha-two titanium aluminides; near gamma and gamma titanium aluminides; and iron, nickel, and iron-nickel base superalloys.

4. The method of claim 1 further comprising the step of preheating said billet to a temperature substantially lower than said transus temperature prior to the step of rapidly heating said billet to slowly raise the temperature of said billet and minimize temperature gradients in said billet during said rapid heating step.

5. The method of claim 1 wherein the step of rapidly heating said billet is performed using infrared, high intensity infrared, direct electric resistance, flame, white light source, laser, or electron beam heating means.

* * * * *